United States Patent [19]

Veaux et al.

[11] Patent Number: 4,540,142

[45] Date of Patent: Sep. 10, 1985

[54] NOSE-WHEEL TYPE LANDING GEAR FOR AIRCRAFT

[75] Inventors: Jacques Veaux, Chatillon; Michel Derrien, Versailles, both of France

[73] Assignee: Messier-Hispnao-Bugatti (S.A.), Montrouge, France

[21] Appl. No.: 588,572

[22] Filed: Mar. 12, 1984

[30] Foreign Application Priority Data

Mar. 25, 1983 [FR] France ............... 83 04915
May 31, 1983 [FR] France ............... 83 08966

[51] Int. Cl.$^3$ ............................................. B64C 25/10
[52] U.S. Cl. ........................... 244/102 R; 244/102 SS
[58] Field of Search ................................. 244/102, 50

[56] References Cited

U.S. PATENT DOCUMENTS

| 2,357,489 | 9/1944 | Palley et al. | 244/102 R |
| 2,851,231 | 9/1958 | Westcott, Jr. | 244/102 R |
| 2,856,143 | 10/1958 | Westcott, Jr. | 244/102 R |
| 2,967,682 | 1/1961 | Fullam et al. | 244/102 R |
| 4,422,602 | 12/1983 | Turiot | 244/102 R |

FOREIGN PATENT DOCUMENTS

| 941109 | 3/1956 | Fed. Rep. of Germany | 244/102 R |
| 1756287 | 5/1979 | Fed. Rep. of Germany | 244/102 SS |
| 376825 | 11/1939 | Italy | 244/102 R |
| 787656 | 12/1957 | United Kingdom | 244/102 R |

Primary Examiner—Galen L. Barefoot
Attorney, Agent, or Firm—McAulay, Fields, Fisher, Goldstein & Nissen

[57] ABSTRACT

The landing gear comprises a shock absorber (4) having a rod (6) slidable in a cylinder (6), a wheel (12) linked to the cylinder, a guide sheath (14) surrounding the shock absorber (4), releasably engageable means (17) for fixing the cylinder at least in rotation relative to the guide sheath (14), and a strut (21) surrounding the sheath. When the strut is retracted under the control of an actuator (42) a rod (80) draws the sheath (14) into the strut (21) thereby compacting the landing gear lengthwise, at the same time a helical groove (38) cooperates with a groove follower (40) to turn the sheath, and hence the shock absorber cylinder (6) and the nose wheel (12) so that the wheel lies flat inside the aircraft when retracted.

20 Claims, 3 Drawing Figures

NOSE-WHEEL TYPE LANDING GEAR FOR AIRCRAFT

The present invention relates to landing gear and more particularly to landing gear of the nose-wheel type as found in particular on aircraft such as combat or fighter planes.

BACKGROUND OF THE INVENTION

In this type of aircraft, it is essential for the nose-wheel landing gear, when in the "retracted" position, to occupy as little space as possible, and in particular as little length as possible. However, for reasons of aircraft structure streamlining, it is also necessary for the wheel to lie in a plane substantially perpendicular to a vertical plane passing though the aircraft axis (when in horizontal flight).

Numerous landing gears exist which both reduce the space occupied by compacting the landing gear components, eg. by compressing the shock-absorber, and which also pivot the wheel through 90° for example as the landing gear moves from an "extended" position to a "retracted" position. Thus, when the landing gear pivots about about an axis which is perpendicular to the above-defined vertical plane, the wheel which was initially parallel to said plane ends up in a perpendicular plane when the landing gear is fully retracted into the aircraft structure, i.e. the wheel occupies a flat position.

However, in all known systems, as the landing gear is compacted to reduce the space it occupies lengthwise, the wheel is generally shifted sideways relative to the landing gear axis, thus calling for a housing of greater width.

Preferred embodiments of the present invention provide a nose-wheel type landing gear for aircraft enabling minimum retracted bulk to be achieved by means of a structure which is simple to construct and which additionally avoids taking up extra space laterally.

SUMMARY OF THE INVENTION

The present invention provides a nose-wheel type landing gear for aircraft, the landing gear comprising:
  a shock absorber essentially constituted by a rod and a cylinder, said rod being slidable in said cylinder, and the projecting end of said rod being connected to a fixed point on the aircraft structure;
  running means connected to the other end of said shock absorber, that is to say to said cylinder;
  a guide sheath situated substantially around said shock absorber;
  sliding bearings situated between the inside wall of said sheath and the outside wall of said cylinder;
  releasably engageable means for connecting said cylinder to said sheath, at least in rotation, when said shock absorber is in a "relaxed" position;
  a strut surrounding said sheath;
  controllable means for exerting a traction force on said sheath to draw said sheath into said strut; and
  means for causing said sheath to rotate as it is drawn into said strut.

In a particular embodiment, said controllable means for exerting a traction force on said sheath to draw it into said strut are constituted by:
  a "collapsible" side brace having one end linked to the structure of said aircraft and having its other end rotatably linked to said strut, the end of said side brace which is linked to said strut including a crank whose end is linked to said guide sheath by a connecting rod.

This means that the entire leading gear needs only two fixing points on the aircraft structure.

BRIEF DESCRIPTION OF THE DRAWINGS

Two embodiments of the invention are described by way of example with reference to the accompanying drawings, in which.

MORE DETAILED DESCRIPTION

Figure 1:
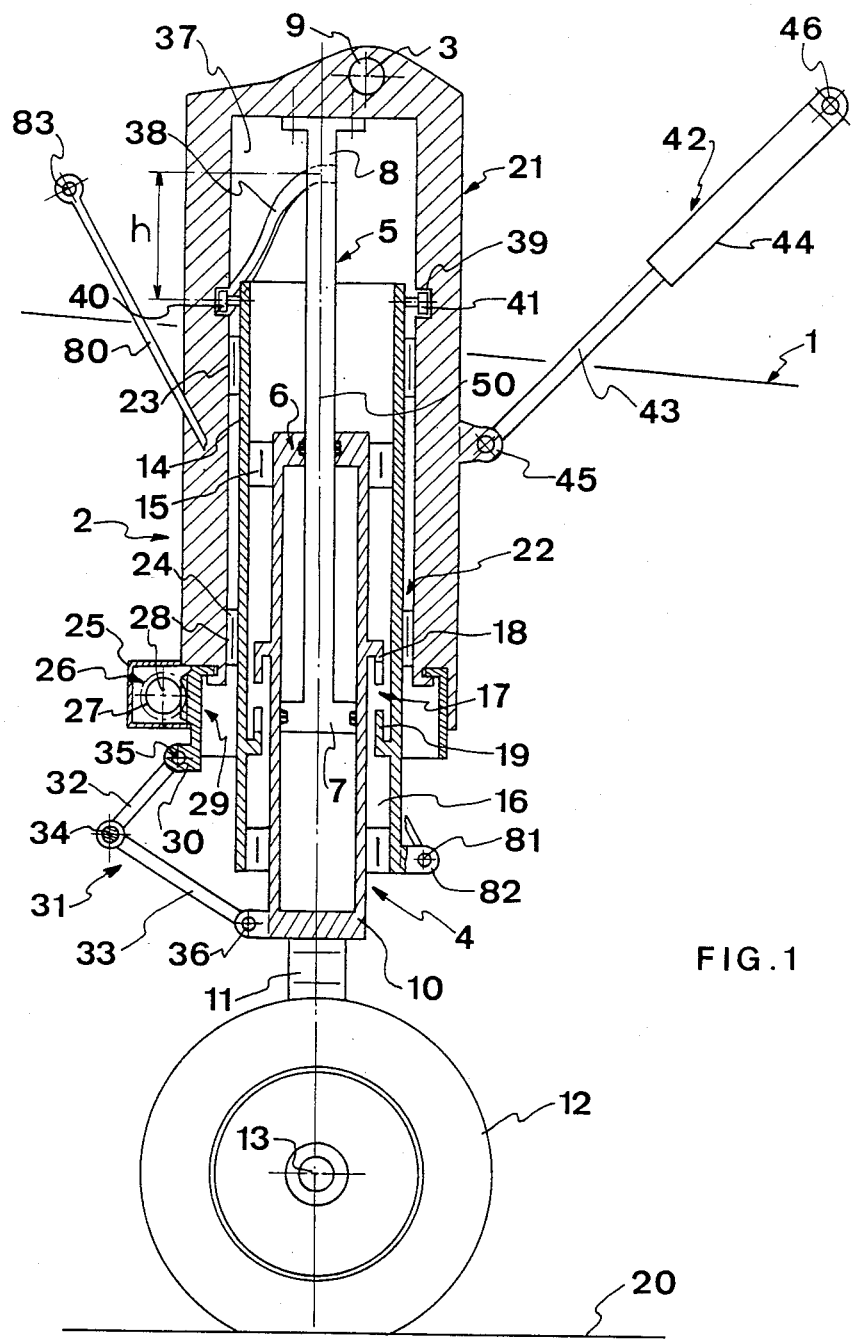
FIG. 1 is a diagrammatic side view, partially in section of a first landing gear embodying the present invention in the extended position.
Figure 2:
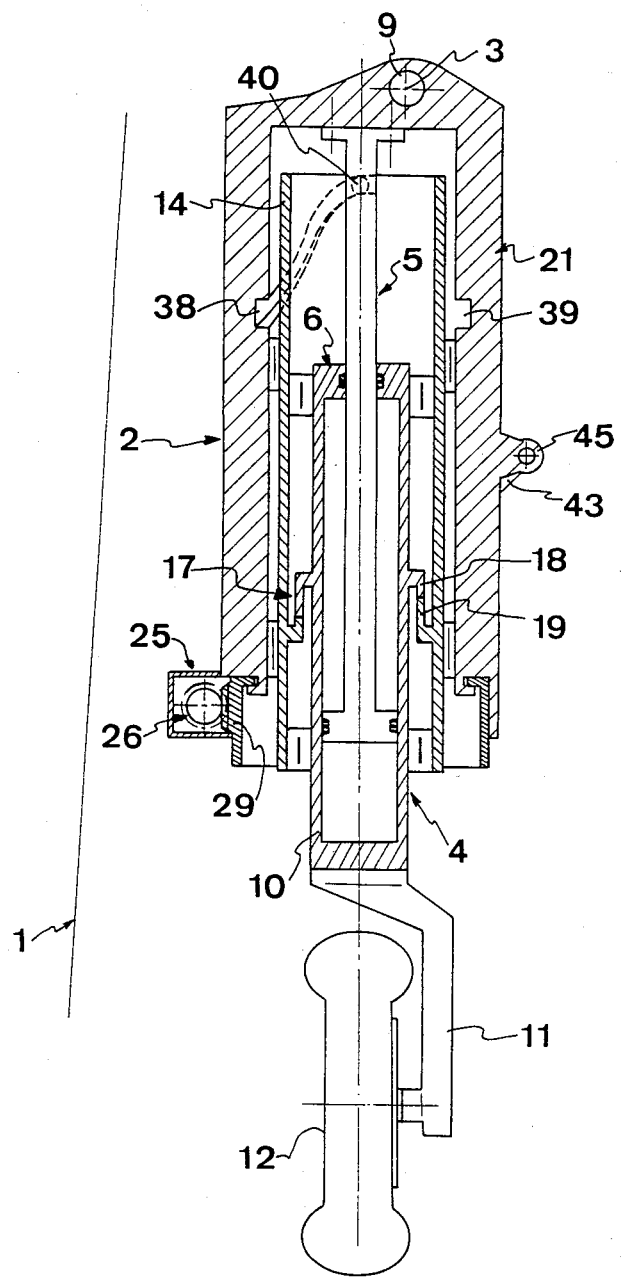
FIG. 2 is a view similar to FIG. 1, but showing the landing gear in its retracted position.

Since FIGS. 1 and 2 both show the same landing gear, but in two different positions, the same references designate the same means, and also, although the description of the landing gear is given mostly with reference to FIG. 1, it is helpful for a full understanding to keep both figures in view.

With more particular reference to FIG. 1, this shows a nose-wheel type landing gear suitable for mounting on the structure of an aircraft which is outlined at 1.

This landing gear 2 is connected to the structure 1 in general via a fixed point 3 using any means known to the person skilled in the art and including an axis of rotation.

More precisely, the landing gear comprises a shock absorber 4 shown diagrammatically and generally constituted by a rod 5 and a cylinder 6, the rod being suitable for sliding inside the cylinder 6 by piston means 7 including, in a manner known per se, throttling and shock absorbing means, the means 7 co-operating with a hydraulic type spring such as an air chamber for example, which has not been shown in FIG. 1 in order to simplify the drawing.

The end 8 of the shock absorber 4, ie. the projecting end of the rod 5, is connected to the point 3 of the structure of the aircraft 1, eg. by means of a rotary axis 9; while the other end of the shock absorber 4, ie. the end 10 of the cylinder 6, includes means 11 for providing lateral support to a wheel 12 which is mounted on said support means 11 via a rotary axis 13.

The shock absorber 4 is situated inside a guide sheath which is advantageously in the shape of a circular cylinder 14 surrounding the greater part of the length of the shock absorber 4. The shock absorber 4, and more particularly the cylinder 6 thereof, is longitudinally slidable inside said guide sheath 14 and the outside wall of the cylinder 6 has bearing means 15, e.g. two bearings as shown in the figure, to guide the shock absorber 4 longitudinally when it moves relative to the said guide sheath 14.

Further, releasably engageable means 17 are situated near the bottom 16 of the sheath 14 and of the cylinder 6. These means are essentially constituted by cams capable of co-operating with one another by means of projecting portions and recessed portions as shown diagrammatically in the figure with the recessed portions being marked 18 and the projecting portions 19. As is explained in detail below, these means enable the cylinder 6 and the sheath 14 to be fixed, at least in rotation, when the wheel 12, for example, no longer bears against the ground, and thus when the shock absorber is relaxed, i.e. when the rod and the cylinder have moved relative to one another in such a manner as to cause the rod 5 to project as far as possible from the cylinder.

The landing gear further includes, surrounding the above-described parts, i.e. the guide sheath 14 and the shock absorber 4, a strut 21 which is rotatably mounted about the rotary point 3 as described above; said strut supporting and maintaining both the guide sheath 14 for rotary and translational sliding as is explained below by means of annular guide bearings 22 which may be two in number (23 and 24) for example, and also a box 25 in which there is a rack arrangement 26 comprising an endless screw 27 rotatably mounted about an axis 28 perpendicular to the plane of the figure for example, and a circular sleeve 29 centered on the general axis 50 of longitudinal symmetry of the landing gear. The sleeve 29 has an external portion 30. An articulated link 31 connects the bottom portion 10 of the shock absorber to the emerging portion 30 of the sleeve 29. The articulated link 31 is made in conventional manner by two levers 32 and 33 which are pivotally mounted to one another about an axis 34 and also about two other axes of rotation 35 and 36 respectively situated on the emerging portion 30 of the sleeve 29 and the bottom portion 10 of the cylinder 6.

Further, the inside wall 37 of the strut 21 has a guide groove 38 which is helical in shape, extending round an angle of at least 90° and over a height h which is advantageously chosen to be equal to the length by which the landing gear is to be compacted for the above-defined purposes. Two groove-following wheels 40 and 41 are disposed symmetrically about the axis of symmetry of the top portion of the sheath for co-operating with two guide grooves 38 and 39 respectively, which grooves act as rails over which the wheels run.

Finally, as mentioned above, a nose-wheel type landing gear must be capable of occupying two positions: essentially an "extended" position as shown in FIG. 1, ie. a position which enables the aircraft to co-operate with ground 20 by means of its running gear during take off and landing, and a second position which is shown in FIG. 2 and which is the position in which the landing gear is "retracted" into a housing in the structure of the aircraft while the aircraft is in flight so as to reduce air resistance as much as possible.

Under these conditions, and in order to cause the landing gear to pass from the "extended" position to the "retracted" position, and vice versa, means such as an internally-locking actuator 42 are provided, which actuator is essentially constituted by a rod 43 and a cylinder 44. One end of the actuator, the rod 43 in this case, is connected to a mid portion of the strut 21, e.g. via a projecting lug 45, and the other end of the actuator, the cylinder in this case, is connected to a fixed point 46 on the structure 1 of the aircraft. The landing gear includes a rigid link 80 having one end connected to a fixed point 83, eg. via a knuckle joint, and having its other end co-operating with the bottom portion of the guide-sheath 14, e.g. via a projecting lug 82 and about an axis 81 having two degrees of rotation.

The above description is of a nose-wheel landing gear which, on passing from the "extended" position shown in FIG. 1 to the "retracted" position, compacts itself by some degree without taking up more space sideways, and also enables the nose wheel to rotate through 90° for example between these two positions.

When the landing gear passes from one of these positions to the other, the following operations take place:
the following description is of the operations that take place when the landing gear passes from its "extended" position of FIG. 1 to its "retracted" position of FIG. 2, and it will be understood that the reverse operations for passing from the "retracted" position to the "extended" position are very easily deduced from the operations described for the first case.

Suppose that the aircraft is resting on the ground 20 by means of its landing gear including the nose-wheel landing gear 2 which exerts a force at least equal to its weight on the shock absorber 4, thereby causing the cylinder 6 to rise at least part of the way up the rod 5 away from a rest position, thus causing the releasably engageable means to disengage (the projecting portions 19 move away from the recessed portions 18 and leave the cylinder 6 free to rotate relative to the guide sheath 14). If the aircraft runs along the ground and is subjected to greater shocks, the shock absorber can absorb them by the rod 5 entering a variable distance into the cylinder 6. Also, since the releasably engageable means are disengaged, the pilot can steer his aircraft by means of the rack arrangement driving the sleeve 29 and hence the articulated link 31 to cause the wheel 12 to pivot, and hence also pivoting the cylinder 6. The nose-wheel landing gear thus provides all the required features of such a landing gear, namely shock absorption and steering while the aircraft is on the ground.

In contrast, during aircraft take-off, the wheel 12 is lifted off the ground 20 at some instant and the shock absorber is no longer subjected to a compressive force. Consequently it extends under the resilient force of its air chamber, and thus causes the releasably engageable means 17 to engage one another with the projecting portions 19 entering the recessed portions 18, thus fixing the cylinder 6 to the sheath 14 at least in rotation, ie. relative rotation between the cylinder 6 and the sheath 14 is prevented. The force which keeps the means in the engaged position is provided by the fluid spring of the air chamber.

Under these conditions, and after the aircraft has taken off and the landing gear has extended by a given amount, the pilot can cause the landing gear to be retracted. To do this he controls the actuator 42 which, in the present example, is first unlocked and then shortens in length. The actuator thus pulls on the strut, causing it to pivot about the point 3. During this rotation, since the axis 81 moves away from the point 83, the rigid link 80 tends to exert traction on the guide sheath 14. This traction causes the guide sheath to be drawn into the strut 21.

However, in addition to being translated as it is drawn upwardly, the sheath 14 is also rotated by virtue of the wheels 40 and 41 co-operating with the helical grooves 38 and 39. In the example shown it is rotated through 90°. Further, since the cylinder 6 is fixed in rotation relative to the sheath 14 by virtue of the releasably engageable means 17 being engaged, the cylinder 6 is also rotated through 90° thus rotating the wheel 12 through the same angle so that it takes up the position shown in FIG. 2. This position is perpendicular to the position shown in FIG. 1. It is thus clear from FIG. 2 that the shock absorber is compacted by the sheath 14 being retracted over a distance h, which furthermore enables the wheel to be rotated without thereby shifting it away from the above-defined axis 50, so lateral space is not required. Such landing gear fulfils both of the aims of the invention, i.e. reducing the space taken up longitudinally without increasing the space taken up laterally.

Naturally, as the shock absorber cylinder 6 is rotated by the articulated link 31, the sleeve 29 is also rotated through 90°, but there is no difficulty since the rack arrangement disengages on take off.

Although the above-described implementation of the landing gear gives good results, it can suffer from a drawback under certain circumstances. In particular, it requires at least three anchor points on the structure of the aircraft: the point 3 where the strut is fixed; the point 46 where the control actuator is fixed; and the point 83 where the link is fixed. In some aircraft, it is not always possible to find three fixing points. The landing gear shown in the center line drawing of FIG. 3 requires only two fixing points.

Figure 3:
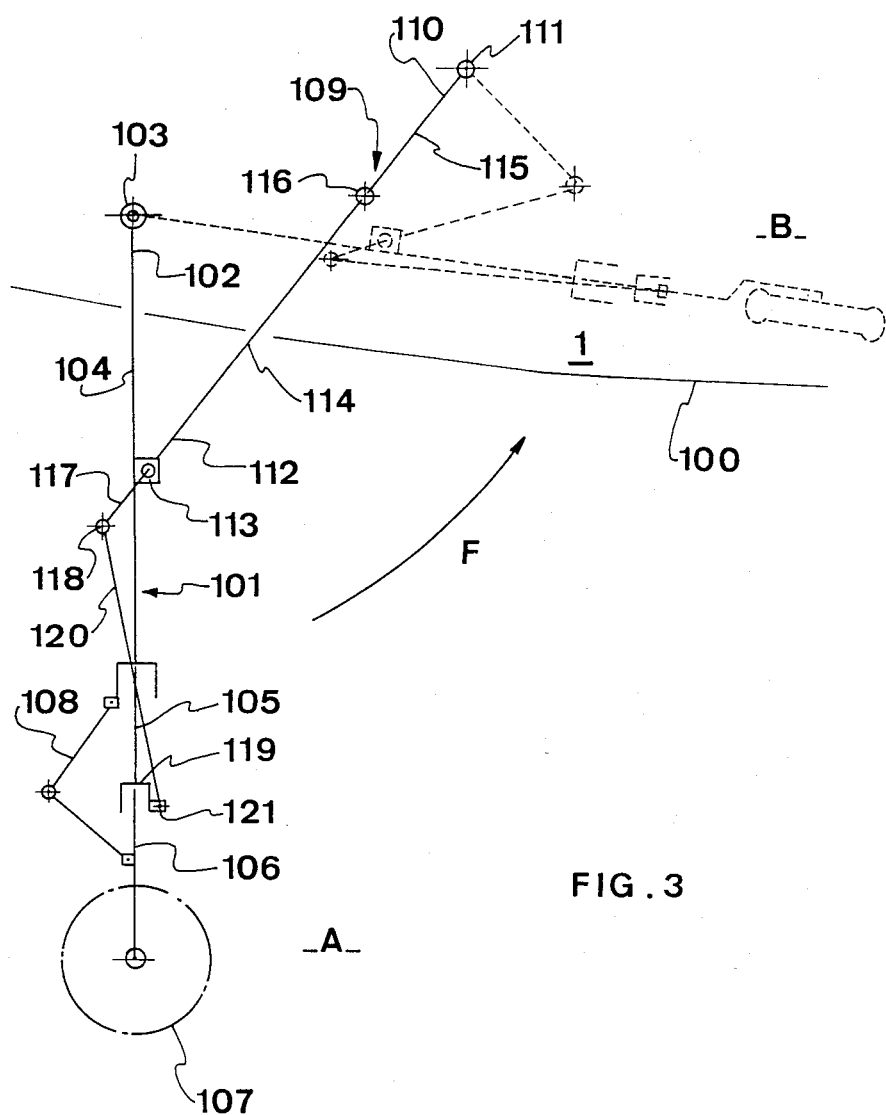
FIG. 3 is a center line diagram of a second landing gear embodying the invention and shown both in the extended position (full lines) and in the retracted position (pecked or dashed lines).

FIG. 3 shows a nose-wheel landing gear 101 for an aircraft having structure 100. To understand how the structure of such landing gear is implemented, it will be helpful to refer back to FIGS. 1 and 2.

Thus, the landing gear 101 has one end 102 rotatably fixed, eg. about an axis 103 which is itself fixed to the structure 100 of the aircraft. In outline, the landing gear 100 comprises a strut 104 having its end 102 rotatably mounted about the axis 103. At its other end, there emerges, as mentioned above, a guide sheath 105 from which in turn there emerges the end of a shock absorber 106, and in particular, as described above, the cylinder of the shock absorber. The emerging end of the shock absorber 106 advantageously includes running gear 107 constituted by one or more wheels. Likewise, as described above, the shock absorber 106, and more particularly its emerging end, is connected to the bottom end of the strut 104 by an articulated link 108.

The landing gear 101 further includes a side brace 109 having one end 110 rotatably linked about a point (or axis) 111 which is fixed to the structure 100 of the aircraft. The other end 112 thereof is rotatably linked about a point or axis 113. The side brace 109 is of the collapsible type, ie. in this embodiment it comprises essentially two levers 114 and 115 which are articulated to one another about an axis 116. However, a side brace could be designed to be equivalent to that of an actuator, ie. a rod slidable in a cylinder which would have a shortening function equivalent to collapsing. The end 112 of the side brace linked to the strut 104 about the point 113 includes a projecting crank constituted, for example, by an extension portion 117 of the lever 114. The end 118 of the crank is linked to the bottom end 119 of the guide sheath 105 at a point 121 by a connecting rod 120 which is rotatably connected at each respectively to the bottom portion 119 of the guide sheath 105 and to the crank 117, e.g. about axes, or depending on the disposition, about knuckle joints or about universal joints.

The landing gear naturally includes means for controlling alignment or disalignment of the two levers 114 and 115 making up the "collapsible" side brace. These means may be constituted for example, by an actuator having its ends connected to respective ones of the levers. To keep the drawing clear, such an actuator has not been illustrated, but its implementation presents no difficulty to the person skilled in the art.

The landing gear 101 operates as follows:
suppose that the landing gear is initially in the extended position, i.e. the position A of FIG. 3.

The operations which take place as the landing gear moves from the extended position as shown at A in FIG. 3 to the retracted position as shown at B, are thus as follows. It is recalled that the wheel rotates about the axis of the shock absorber cylinder 106 as the landing gear is retracted into the structure 100 of the aircraft. This feature is not described further since it is explained with reference to FIGS. 1 and 2.

When the landing gear is in the extended position (A), the side brace is fully extended, i.e. the levers 114 and 115 are substantially colinear. By some suitable means, e.g. an actuator as mentioned above, the alignment of the side brace is broken, e.g. by making the lever 115 rotate anticlockwise about the point 111 thereby causing a corresponding clockwise rotation of the lever 114 relative to the strut 104. This causes the crank 117 which is fixed to the lever 114 to rotate clockwise as well thereby tending to move the point 118 away from the point 121.

Because of this, since the point 118 is tending to move away from the position occupied by the point 121 in the landing gear extended position, the connecting rod 120, as it rotates, thus exerts a traction force on the guide sheath 105 causing it to move into the strut 104 as the landing gear moves along a path F from the extended position to the retracted position (B).

Compared with the embodiment described with reference to FIGS. 1 and 2 this embodiment omits one of the fixing points on the aircraft structure which can sometimes be important, particularly when there is little room available as in aircraft such as fighter planes.

Naturally, when the landing gear passes from the retracted position (B) to the extended position (A), the side brace 109 is caused to be aligned in the same manner by the actuator such that the various rotations take place in the opposite directions with the point 118 tending to move towards the emerging end 119 of the guide sheath 105. This causes the guide sheath to move out from the strut 104.

We claim:
1. A nose-wheel type landing gear for aircraft, comprising:
   a shock absorber including a rod and a cylinder, said rod being slidable in said cylinder, and having a projecting end connected to a fixed point on the aircraft structure;
   running means connected to the other end of said shock absorber;
   a guide sheath substantially around said shock absorber;
   sliding bearings between the inside wall of said sheath and the outside wall of said cylinder;
   releasably engageable means for connecting said cylinder to said sheath, at least in rotation, when said shock absorber is in a "relaxed" position;
   a strut surrounding said sheath;
   controllable means for exerting a traction force on said sheath to draw said sheath into said strut; and
   means for causing said sheath to rotate as it is drawn into said strut.

2. The landing gear according to claim 1, wherein said releasably engageable means comprises cams projecting and hollowed out respectively from the outside wall of said cylinder and from the inside wall of said guide sheath.

3. The landing gear according to claim 1, wherein said controllable means comprises an actuator having one end suitable for fixing to said structure of the aircraft by first link means and its other end being linked by second link means to said guide sheath.

4. The landing gear according to claim 3, wherein said second link means includes said strut and a link having one end rotatbly mounted on said aircraft structure and having its other end mounted on said guide sheath.

5. The landing gear according to claim 1, wherein said rotation means comprises at least one helical groove extending over a given angle of rotation and over a predetermined height h and groove-following means fixed to said guide sheath, said groove-following means running along said groove as said sheath is moved in translation into said strut to cause said sheath to rotate relative to the strut.

6. The landing gear according to claim 1, wherein said controllable means comprises a "collapsible" side brace having one end linked to the structure of said aircraft and having its other end rotatably linked to said strut, the end of said side brace linked to said strut including a crank, and a connecting rod linking an end of said crank to said guide sheath.

7. The gear according to claim 6, wherein said side brace includes two levers articulated to each other about a common point.

8. The landing gear according to claim 1, wherein said running means is connected to said cylinder.

9. The landing gear according to claim 2, wherein said controllable means comprises an actuator having one end suitable for fixing to said structure of the aircraft by first link means and its other end being linked by second link means to said guide sheath.

10. The landing gear according to claim 9, wherein said second link means includes said strut and a link having one end rotatably mounted on said aircraft structure and having its other end mounted on said guide sheath.

11. A nose-wheel type landing gear for aircraft, comprising:
a shock absorber having a rod and a cylinder, said rod being slidable in said cylinder, and a projecting end of said rod being connected to a fixed point on the aircraft structure;
running means connected to the other end of said shock absorber a guide sheath substantially around said shock absorber;
sliding bearings situated between the inside wall of said sheath and the outside wall of said cylinder;
releasably engageable means for connecting said cylinder to said sheath, at least in rotation, when said shock absorber is in a "relaxed" position;
a strut surrounding said sheath;
controllable means for exerting a traction force on said sheath to draw said sheath into said strut; and
means for controlling rotation of said sheath as it enters said strut including at least one helical groove extending over a given angle of rotation and over a predetermined height h and groove-following means fixed to said guide sheath, said groove-following means running along said groove as said sheath is moved in translation into said strut to cause said sheath to rotate relative to the strut.

12. The gear according to claim 11, wherein said releasably enagageable means include cams projecting and hollowed out respectively from the outside wall of said cylinder and from the inside wall of said guide sheath.

13. The landing gear according to claim 11, wherein said controllable means comprises an actuator having one end fixed by first link means to said aircraft structure and its other end being linked by second link means to said guide sheath.

14. The landing gear according to claim 12, wherein said controllable means comprises an actuator having one end fixed by first link means to said aircraft structure and its other end being linked by second link means to said guide sheath.

15. The landing gear according to claim 13, wherein said second link means comprises said strut and a link having one end rotatably mounted on said aircraft structure and its other end mounted on said guide sheath.

16. The landing gear according to claim 14, wherein said second link means comprises said strut and a link having one end rotatably mounted on said aircraft structure and its other end mounted on said guide sheath.

17. The landing gear according to claim 11, wherein said controllable means includes a "collapsible" side brace having one end linked to the aircraft structure and having its other end rotatably linked to said strut, the end of said side brace linked to said strut including a crank whose end is linked to said guide sheath by a connecting rod.

18. The landing gear ccording to claim 17, wherein said side brace includes two levers articulated to each other about a common point.

19. The landing gear according to claim 12, wherein said controllable means comprises a "collapsible" side brace having one end linked to the structure of said aircraft and having its other end rotatably linked to said strut, the end of said side brace linked to said strut including a crank, and a connecting rod linking an end of said crank to said guide sheath.

20. The landing gear according to claim 19, wherein said side brace includes two levers articulated to each other about a common point.

* * * * *